United States Patent
List et al.

(10) Patent No.: US 10,768,306 B2
(45) Date of Patent: Sep. 8, 2020

(54) LENS DEVICE FOR AN OPTOELECTRONIC SENSOR OF A MOTOR VEHICLE COMPRISING A SECURING UNIT, OPTOELECTRONIC SENSOR, MOTOR VEHICLE AND METHOD

(71) Applicant: VALEO Schalter und Sensoren GmbH, Bietigheim-Bissingen (DE)

(72) Inventors: Gerald List, Bietigheim-Bissingen (DE); Werner Hartmann, Bietigheim-Bissingen (DE); Peter Horvath, Bietigheim-Bissingen (DE)

(73) Assignee: Valeo Schalter und Sensoren GmbH, Bietigheim-Bissinger (DE)

( * ) Notice: Subject to any disclaimer, the term of this patent is extended or adjusted under 35 U.S.C. 154(b) by 371 days.

(21) Appl. No.: 15/559,931

(22) PCT Filed: Mar. 15, 2016

(86) PCT No.: PCT/EP2016/055491
§ 371 (c)(1),
(2) Date: Jan. 12, 2018

(87) PCT Pub. No.: WO2016/150753
PCT Pub. Date: Sep. 29, 2016

(65) Prior Publication Data
US 2018/0143323 A1 May 24, 2018

(30) Foreign Application Priority Data
Mar. 20, 2015 (DE) .................. 10 2015 104 212

(51) Int. Cl.
*G01S 17/931* (2020.01)
*G02B 7/02* (2006.01)
*G01S 7/481* (2006.01)

(52) U.S. Cl.
CPC .......... *G01S 17/931* (2020.01); *G01S 7/4813* (2013.01); *G01S 7/4816* (2013.01); *G02B 7/026* (2013.01)

(58) Field of Classification Search
CPC .... G01S 17/936; G01S 7/4816; G01S 7/4813; G02B 7/026
(Continued)

(56) References Cited

U.S. PATENT DOCUMENTS

| 2,808,762 A | 10/1957 | De Grave, Jr. | |
| 2003/0197959 A1* | 10/2003 | Chee | G02B 7/022 359/811 |

(Continued)

FOREIGN PATENT DOCUMENTS

| CN | 104272133 A | 1/2015 |
| DE | 12 62 041 B | 2/1968 |

(Continued)

OTHER PUBLICATIONS

Machine translation of specification of DE19703095, Jun. 4, 1998 (Year: 1998).*
(Continued)

*Primary Examiner* — Frank J McGue
(74) *Attorney, Agent, or Firm* — Osha Liang LLP

(57) ABSTRACT

The invention relates to a lens apparatus (6) for an optoelectronic sensor (1) of a motor vehicle, comprising a reception lens (8), comprising a support device (9), on which a rear side (10) of the reception lens (8) rests in parts, and comprising a fastening device (12), by means of which the reception lens (8) is held on the support device (9) with a spring force that acts in a first direction (z), wherein the fastening device (12) has a holding frame (15), which surrounds the reception lens (8) at least in parts, and at least one spring element (16), which supports the reception lens
(Continued)

(8) in relation to the holding frame (15) in at least one second direction (x, y) that differs from the first direction (z).

11 Claims, 5 Drawing Sheets

(58) Field of Classification Search
  USPC .......................................................... 342/70
  See application file for complete search history.

(56) References Cited

U.S. PATENT DOCUMENTS

2015/0177368 A1* 6/2015 Bayha ................... G01S 7/4868
                                                            356/4.01
2015/0319346 A1* 11/2015 Sekiguchi .............. G02B 7/026
                                                            359/824

FOREIGN PATENT DOCUMENTS

| DE | 44 12 770 A1 | 10/1995 |
|---|---|---|
| DE | 196 23 426 A1 | 1/1998 |
| DE | 197 03 095 C1 | 6/1998 |
| DE | 10 2012 006869 A1 | 10/2013 |
| JP | H09-274123 A | 10/1997 |
| JP | 2010-020238 A | 1/2010 |

OTHER PUBLICATIONS

Machine translation of abstract of DE 19703095, Jun. 4, 1998 (Year: 1998).*
Drawings of DE19703095, Jun. 4, 1998 (Year: 1998).*
Machine translation of PCT Written Opinion on PCT/EP2016/055491, Jun. 9, 2016 (Year: 2016).*
International Search Report issued in corresponding application No. PCT/EP2016/055491 dated Jun. 9, 2016 (6 pages).
Written Opinion of the International Searching Authority issued in corresponding application No. PCT/EP2016/055491 dated Jun. 9, 2016 (6 pages).
German Search Report issued in corresponding application No. 10 2015 104 212.6 dated Nov. 25, 2015 (10 pages).
The First Office Action issued in corresponding Chinese Application No. 201680027232.3, dated Apr. 14, 2020 (18 pages).

* cited by examiner

LENS DEVICE FOR AN OPTOELECTRONIC SENSOR OF A MOTOR VEHICLE COMPRISING A SECURING UNIT, OPTOELECTRONIC SENSOR, MOTOR VEHICLE AND METHOD

The present invention relates to a lens apparatus for an optoelectronic sensor of a motor vehicle, comprising a reception lens, comprising a support device, on which a rear side of the reception lens rests in parts, comprising a fastening device, by means of which the reception lens is held on the support device with a spring force that acts in a first direction. Moreover, the present invention relates to an optoelectronic sensor comprising such a lens apparatus. The invention furthermore relates to a motor vehicle comprising such an optoelectronic sensor. Finally, the present invention relates to a method for assembling a lens apparatus.

In the present case, the interest is directed, in particular, to lens apparatuses for optoelectronic sensors. By way of example, such optoelectronic sensors can be embodied as LIDAR sensors (LIDAR—light detection and ranging) or as laser scanners. By way of example, such optoelectronic sensors are attached to motor vehicles in order to register the surroundings of the motor vehicle during the drive or when the motor vehicle is operational. Here, the optoelectronic sensor is a scanning optical measuring apparatus, by means of which objects or obstacles in the surrounding region of the motor vehicle can be registered. By way of example, the optoelectronic sensor can be used to measure a distance between the motor vehicle and the object according to the light pulse time-of-flight method. Usually, the optoelectronic sensor comprises a transmission unit which, for example, has a laser diode, by means of which an optical transmission signal can be emitted. Moreover, the optoelectronic sensor comprises a corresponding reception unit which, for example, has at least one photodiode, by means of which the transmission signal that was reflected by an object can be received as a reception signal. The reception lens is disposed upstream of the reception unit in the direction of propagation.

The prior art has disclosed lens apparatuses, in which the reception lens is held on a support device with the aid of an appropriate fastening device. To this end, the reception lens can be held on the support device, for example by means of a holding frame made of aluminium. To this end, the holding frame can be e.g. adhesively bonded to the support device after assembly. The problem here is that the lateral region or the lateral faces of the reception lens are open for stray light. In order to prevent stray light from being coupled into the reception lens in the lateral regions, the lateral region can be appropriately masked after assembly. A further disadvantage of such a fastening device should be considered to be the aspect that the holding frame cannot compensate any tolerances or dimensional changes as a consequence of temperature variations.

In this context, DE 10 2012 006 869 A1 describes an optoelectronic sensor device, in particular a laser scanner or a LIDAR appliance, for a motor vehicle. The optoelectronic sensor device comprises a holding device for holding the reception lens and a stop for reducing the intensity of the reception signal. Here, the stop is held on the holding device. Provision can also be made for the stop to be embodied as a spring element, by means of which the reception lens is braced on a frame with a spring force.

It is an object of the present invention to highlight a solution, by means of which it is possible to provide a lens apparatus for an optoelectronic sensor of the aforementioned type in a more cost-effective manner.

According to the invention, this object is achieved by a lens apparatus, by an optoelectronic sensor, by a motor vehicle and by a method comprising the features according to the independent patent claims. Advantageous embodiments of the invention are the subject matter of the dependent patent claims, the description and the figures.

A lens apparatus according to the invention for an optoelectronic sensor of a motor vehicle comprises a reception lens. Moreover, the lens apparatus comprises a support device, on which a rear side of the reception lens rests in parts. Moreover, the lens apparatus comprises a fastening device, by means of which the reception lens is held on the support device with a spring force that acts in a first direction. The fastening device has a holding frame which surrounds the reception lens at least in parts. Moreover, the fastening device has at least one spring element, which supports the reception lens in relation to the holding frame in at least one second direction that differs from the first direction.

The lens apparatus serves for use in an optoelectronic sensor of a motor vehicle. In particular, the lens apparatus can be used in a LIDAR sensor or a laser scanner. The lens apparatus comprises the reception lens which, for example, is disposed upstream of a reception unit in the propagation direction of the reception signal of the optoelectronic sensor. By way of example, the reception lens can be manufactured from a glass or a plastic. The reception lens can have a substantially flat rear side, which faces the reception unit, and a front side with appropriate curvature. Further, the lens apparatus has a support device which, in particular, may have an embodiment in the form of a frame. Here, by way of its rear side, the reception lens is supported against the support device.

Moreover, the lens apparatus comprises the fastening device, by means of which the reception lens is held on the support device in a resilient manner along the first direction. The fastening device comprises a holding frame which surrounds the reception lens at least in parts. In particular, the holding frame can completely surround the reception lens. Thus, the reception lens can be arranged within the holding frame. Moreover, the fastening device comprises at least one spring element, by means of which the reception lens is supported in relation to the holding frame. Here, the reception lens is held on the support device in a first direction by means of a spring force. By way of example, the first direction may extend perpendicular to the rear side of the reception lens. By way of the at least one spring element, the reception lens is supported in relation to the holding frame along at least one second direction. The reception lens can also be supported in relation to the holding frame along a third direction. The second direction and/or the third direction may extend e.g. substantially perpendicular to the first direction.

By way of the spring element, the reception lens is held resiliently in relation to the holding frame. As a consequence, centring the reception lens within the holding frame can be achieved by way of the spring element. Moreover, being able to compensate dimensional changes of the lens apparatus or of the components of the lens apparatus as a consequence of the action of temperature can be achieved by the resilient configuration of the spring element or the elastic deformability of the spring element. Further, a defined holding force can be exerted on the reception lens with the aid of the spring element. Moreover, it is possible to compensate manufacturing tolerances, vibrations during the operation of the motor vehicle or other influences.

Preferably, the at least one spring element provides the spring force acting in the first direction for holding the reception lens on the support device. Thus, by means of the at least one spring element, the reception lens is resiliently mounted in relation to the support device, for example a contact face of the support device, along the first direction. As a consequence, the spring element serves firstly for resiliently fastening the reception lens and secondly for centring the reception lens within the holding frame. Consequently, it is possible to guarantee reliable operation of the lens apparatus in the optoelectronic sensor. Moreover, such a spring element can be provided in a cost-effective manner. Furthermore, it is advantageous if the holding frame circumferentially surrounds the reception lens in a predetermined lateral region and shields the predetermined lateral region from optical radiation. The reception lens may have a predetermined lateral region in which the reception lens is held with the fastening device. The reception lens can have a substantially cuboid embodiment in the predetermined lateral region. Here, the holding frame is embodied in such a way that it surrounds, in particular completely surrounds, the predetermined lateral region of the reception lens. As a consequence, it is possible in the predetermined lateral region to prevent optical radiation or stray light from entering into the reception lens from the outside. By way of example, this stray light can be light in the infrared wavelength range and/or in the visible wavelength range. As a consequence, it is possible to prevent stray light from reaching the reception unit of the optoelectronic sensor. As a consequence, it is possible to guarantee a reliable operation of the optoelectronic sensor.

Furthermore, it is advantageous if the support device has a holding element and the fastening device has a fastening element that corresponds to the holding element, wherein the reception lens is held on the support device by an interaction of the holding element with the fastening element in the first direction. By way of example, the holding element of the support device can be an appropriate elevation or a holding lug. The fastening element of the fastening device may have a corresponding cut-out. Hence, the fastening element of the fastening device can be hooked, as it were, onto the holding element. Alternatively, provision can also be made for the holding element to have a corresponding cut-out and the fastening element to have an elevation that corresponds to the recess. When the lens device is fastened to the support device, the support device can be deflected in the first direction and the at least one spring element may be compressed in the process. Subsequently, the holding element can be connected to the corresponding fastening element.

Preferably, the spring element or the holding frame comprises the fastening element. If the holding element has a corresponding elevation, the corresponding fastening element can, for example, be embodied in the style of a tab which can be hooked on the holding element. Now, this fastening element or this tab can be embodied on the spring element, on the holding frame, or on both. In this way, a simple and cost-effective connection between the support device and the fastening device can be ensured.

In an embodiment, the fastening device has a spring wire, wherein at least a first region of the spring wire forms the at least one spring element. By way of example, the spring wire can be manufactured from an appropriate metal or metal wire. The spring wire may have an elastically deformable embodiment. By way of example, the spring wire can have an appropriate curvature in the first region or portion such that the first region of the spring wire embodies a form of a tab in comparison with the remaining spring wire. As a consequence, the spring element can be provided in a simple and cost-effective manner.

In a further embodiment, the holding frame has at least one recess, in which at least a second region of the spring wire is arranged in such a way that the latter is held on the holding frame in the first direction. By way of example, the holding frame can be formed from a sheet. In particular, the holding frame can be embodied as a punching and bending part. The recesses or cut-outs may be provided, for example, in the corners of the holding frame. As a consequence, the spring wire can latch into the corners in the holding frame in an interlocking manner by way of the cut-outs, without an additional connection element.

In a further embodiment, the holding frame has an integral embodiment with the at least one spring element. The holding frame and the at least one spring element can be formed together from an appropriate sheet which is produced by a punching and bending process. The at least one spring element can then resiliently support the lens apparatus, both along the first direction and along the second direction. As a consequence, the fastening device can be produced in a simple and cost-effective manner.

An optoelectronic sensor according to the invention for a motor vehicle comprises a lens apparatus according to the invention. In particular, the optoelectronic sensor can be embodied as a LIDAR sensor or as a laser scanner. The optoelectronic sensor can have a transmission unit for emitting an optical transmission signal and a reception unit for receiving, as a reception signal, the transmission signal that was reflected by an object.

A motor vehicle according to the invention comprises at least one optoelectronic sensor according to the invention. By way of example, the optoelectronic sensor can be part of a driver assistance system of the motor vehicle. Using the optoelectronic sensor, it is possible to register a distance from an object or obstacle in a surrounding region of the motor vehicle. In particular, the motor vehicle can be embodied as a passenger motor vehicle.

A method according to the invention serves for assembling a lens apparatus for an optoelectronic sensor of a motor vehicle. Here, a reception lens is arranged on a support device in such a way that a rear side of the reception lens rests thereon in parts. Moreover, a fastening device is arranged on the reception lens in such a way that the reception lens is held on the support device with a spring force that acts in a first direction. The fastening device has a holding frame, which surrounds the reception lens at least in parts, and at least one spring element, by means of which the reception lens is supported in relation to the holding frame in at least one second direction that differs from the first direction.

The preferred embodiments that were presented with respect to the lens apparatus according to the invention and the advantages thereof apply accordingly to the optoelectronic sensor according to the invention, the motor vehicle according to the invention and the method according to the invention.

Further features of the invention emerge from the claims, the figures and the description of the figures. The features and feature combinations that are mentioned above in the description and the features and feature combinations that are mentioned below in the description of the figures and/or only shown in the figures are usable not only in the respectively specified combination, but also in other combinations or on their own, without departing from the scope of the invention. As a consequence, embodiments which are not explicitly shown and explained in the figures but which emerge and are producible from the explained embodiments by way of separate feature combinations should also be considered as comprised and disclosed by the invention. Embodiments and feature combinations, which consequently do not have all features of an independent claim as originally phrased, should also be considered to be disclosed.

The invention is now explained in more detail on the basis of preferred exemplary embodiments and with reference to the attached drawings.

In the figures, the same or functionally equivalent elements are provided with the same reference signs.

Figure 1:
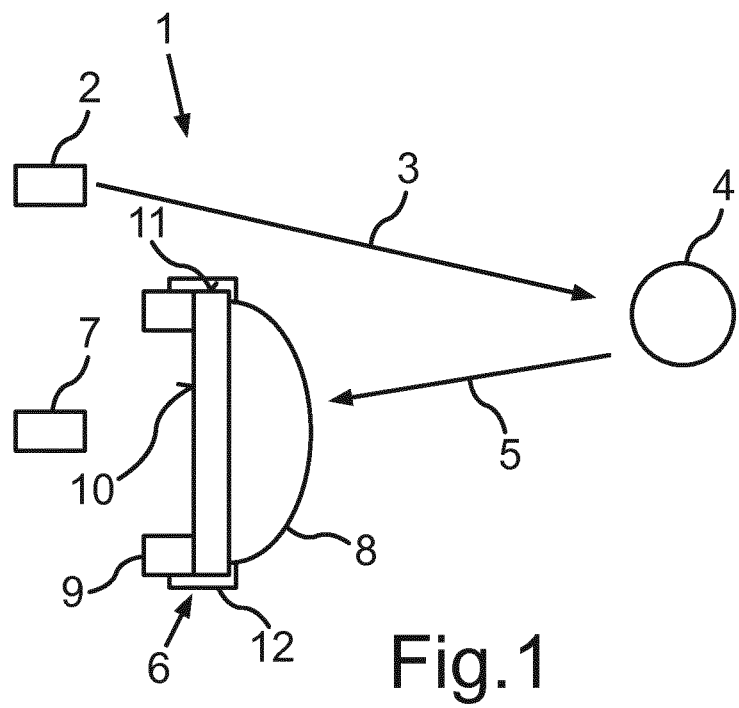
FIG. 1 shows a schematic illustration of an optoelectronic sensor for a motor vehicle, said optoelectronic sensor having a lens apparatus.

FIG. 1 shows an optoelectronic sensor 1 for a motor vehicle in a schematic illustration. By way of example, the optoelectronic sensor 1 can be a LIDAR sensor or a laser scanner. The optoelectronic sensor 1 can be arranged on the motor vehicle. The optoelectronic sensor 1 comprises a transmission unit 2, by means of which an optical transmission signal 3 in the form of laser radiation can be emitted. Further, provision can be made of a deflection device or a mirror (not depicted here), by means of which the transmission signal 3 or the laser radiation can be deflected. The transmission signal emitted by the transmission device 2 impinges on an object 4 or an obstacle, which may be situated, for example, in a surrounding region of the motor vehicle. The transmission signal 3 is reflected at the object 4 and reaches a lens apparatus 6 as a reception signal 5 and, subsequently, reaches a reception device 7. By way of example, the reception device 7 can be a photodiode.

The lens apparatus 6 comprises a reception lens 8. By way of example, the reception lens 8 can be manufactured from a glass or a plastic. The reception lens 8 is supported against a support device 9. By way of example, the support device 9 can have a frame-shaped embodiment. Here, with its rear side 10, the reception lens 8 rests on the support device 9 at least in parts. The reception lens 8 further comprises a lateral region 11, on which a fastening device 12 is arranged. As explained in more detail below, the reception lens 8 is held resiliently on the support device 9 by means of the fastening device 12.

Figure 2:
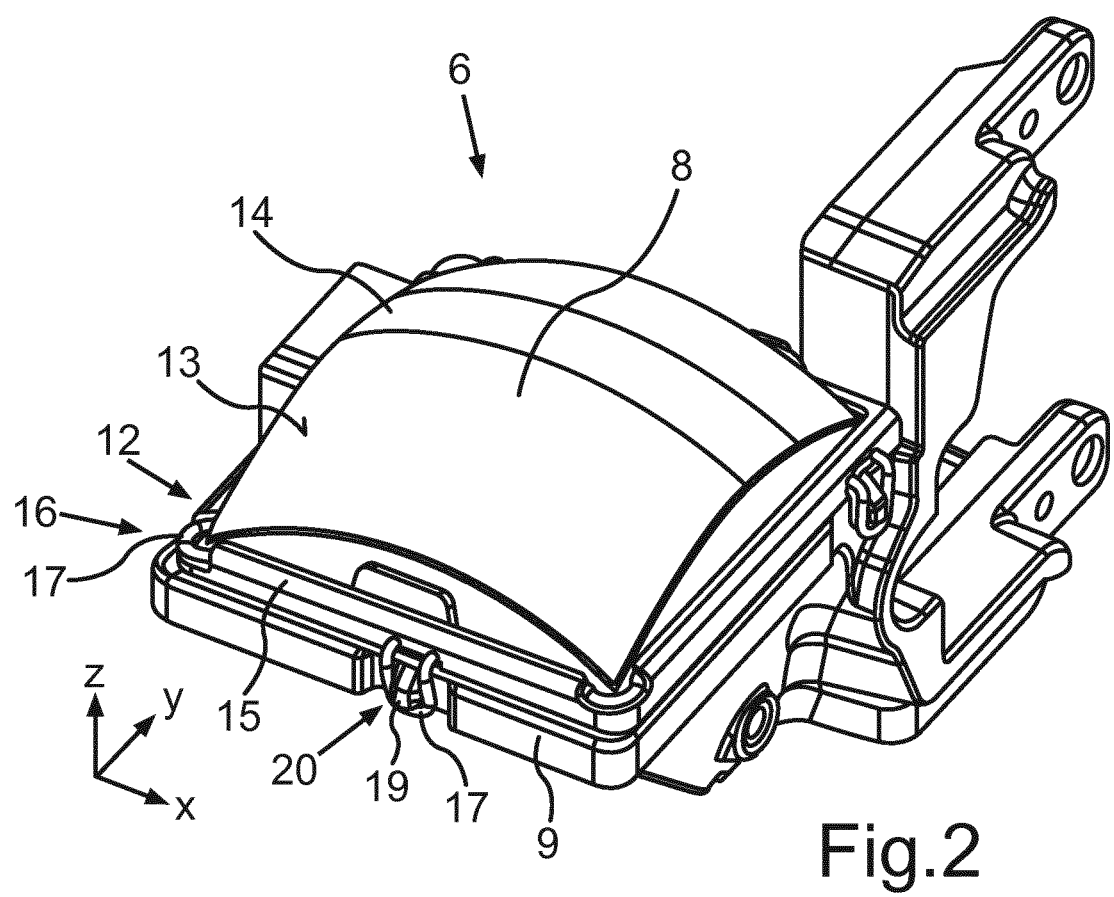
FIG. 2 shows a perspective view of the lens apparatus in accordance with a first embodiment.

FIG. 2 shows a perspective view of the lens apparatus 6 according to a first embodiment. Here, a stop 14 is arranged on an upper side 13 of the reception lens 8. By way of example, the stop 14 can be formed by appropriate lacquering or a lacquer layer. Further, the support device 9, which has a substantially frame-shaped embodiment, can be recognized in FIG. 2. Moreover, the fastening device 12 is shown, said fastening device comprising a holding frame 15 and a spring element 16 in the form of a spring wire 17 in the present exemplary embodiment. The reception lens 8 is resiliently held on the support device 9 in a first direction z by means of the fastening device 12.

Figure 3:
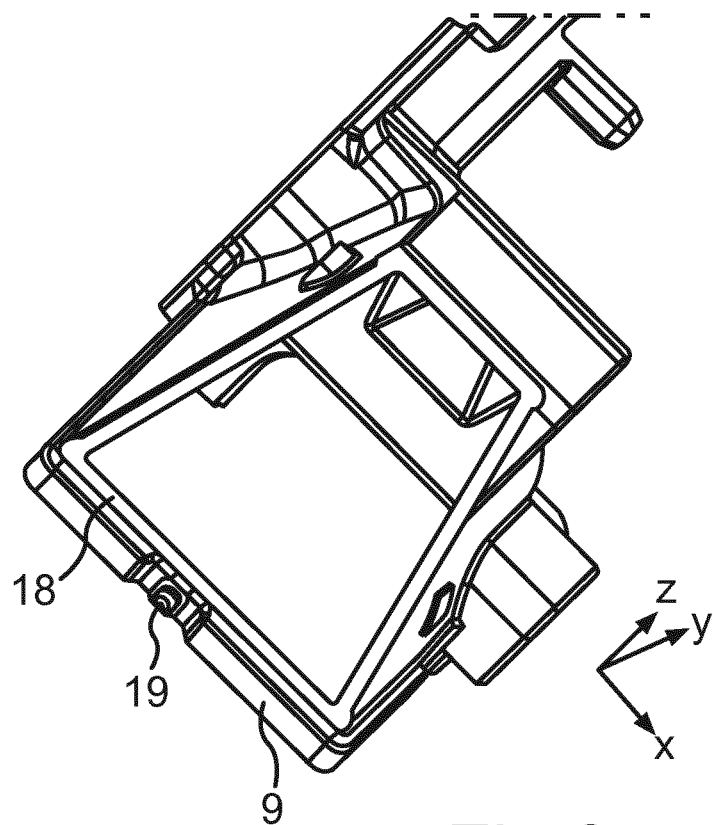
FIG. 3 shows a perspective view of the support device of the lens apparatus according to FIG. 2.

FIG. 3 shows a perspective view of the support device 9 of the lens apparatus 6. Here, it is possible to recognize that the support device 9 has a substantially frame-shaped embodiment. The support device 9 can be fastened to the motor vehicle and can have a motor vehicle fastening device to this end. The support device 9 has a contact face 18, on which the reception lens 8 can be arranged in parts with the rear side thereof. Further, the support device 9 has a holding element 19 in the form of an elevation or holding lug, on which the fastening device 12 or a fastening element 20 of the fastening device 12 can be arranged.

Figure 4:
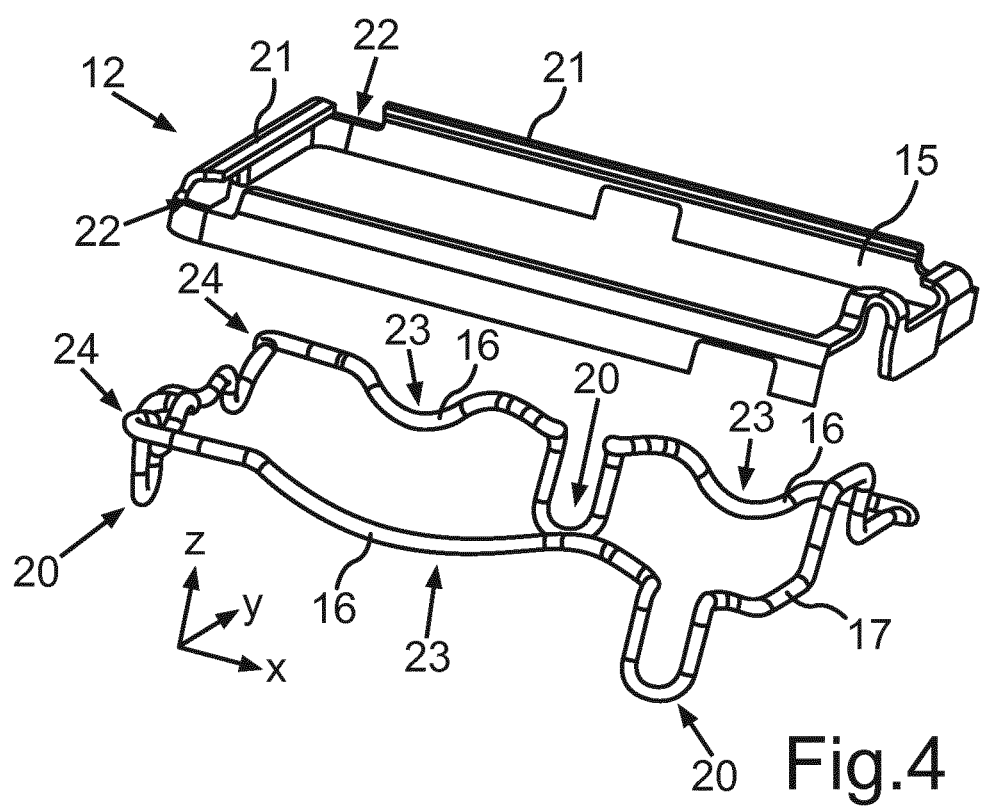
FIG. 4 shows a perspective view of a fastening device of the lens apparatus according to FIG. 2, with the fastening device comprising a holding frame and a spring wire.

FIG. 4 shows a perspective view of the fastening device 12 of the lens apparatus 6 according to FIG. 2. Here, in particular, the holding frame 15 can be recognized, the latter being manufactured from e.g. a metal sheet. The holding frame 15 has corresponding tab elements 21 in its upper region, by means of which tab elements the reception lens 8 that is arranged in the holding frame 15 can be held along the first direction z. The spring wire 17 is deformed or bent in such a way that first regions 23 of the spring wire 17 respectively form the spring element 15. In the first regions 23, the spring wire has a predetermined curvature in the first direction z. In the present exemplary embodiment, the spring wire 17 forms three spring elements 15. The reception lens 8 can be arranged between the spring wire 17 and the support device 9 along the first direction z. Moreover, the holding frame 15 has appropriate recesses 22 in the corner regions, the spring wire 17 being able to be latched into said recesses in an interlocking manner. To this end, the spring wire 17 is bent in such a way that second parts 24 of the spring wire 17 can be brought into the corresponding recesses 22 of the holding frame 15. Moreover, the spring wire 17 is bent in such a way that it forms corresponding fastening elements 20, which can be hooked into the corresponding holding elements 19 of the support device 9.

By means of the spring elements 15, the reception lens 8 can be held in a resilient manner in relation to the support device 9 in the first direction z. The spring wire 17 or the spring element 16 moreover centres the reception lens 8 in the holding frame 15. As a result of this, the reception lens 8 is supported in relation to the holding frame 15 in a second direction x and/or a third direction y by means of the spring element 16. The second direction x and the third direction y extend substantially perpendicular to the first direction z. Consequently, manufacturing tolerances or expansions caused by temperature can be compensated in the individual components of the lens apparatus 6. Moreover, it is possible to damp vibrations or tremors, which may arise e.g. when the motor vehicle is in motion.

Figure 5:
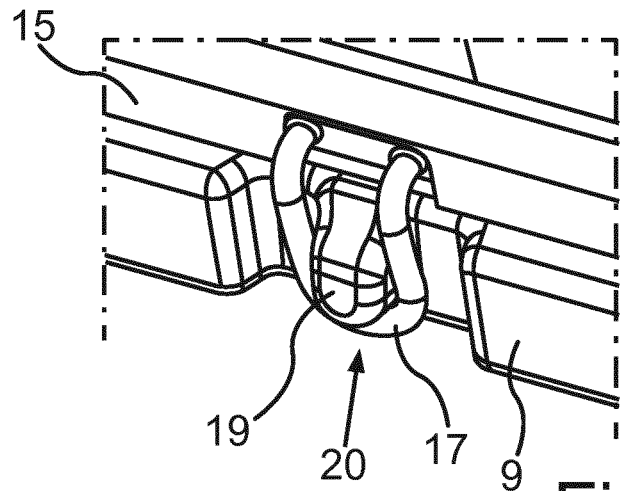
FIG. 5 shows a holding element of the support device interacting with a fastening element of the fastening device of the lens apparatus according to FIG. 2.

FIG. 5 shows a detailed view of the lens apparatus 6 according to FIG. 2, with the interaction between the holding element 19 and the fastening element 20 being shown. Here, it is possible to recognize how the fastening element 20 or a tab of the spring wire 17 is held by the holding element 19 or the holding lug. During the assembly of the lens apparatus 6, the fastening apparatus 12, which surrounds the reception lens 8 in parts, can be moved in the first direction z such that the at least one spring element 16 is elastically deformed. As a consequence, the fastening element 20 can be hooked on the holding element 19.

Figure 6:
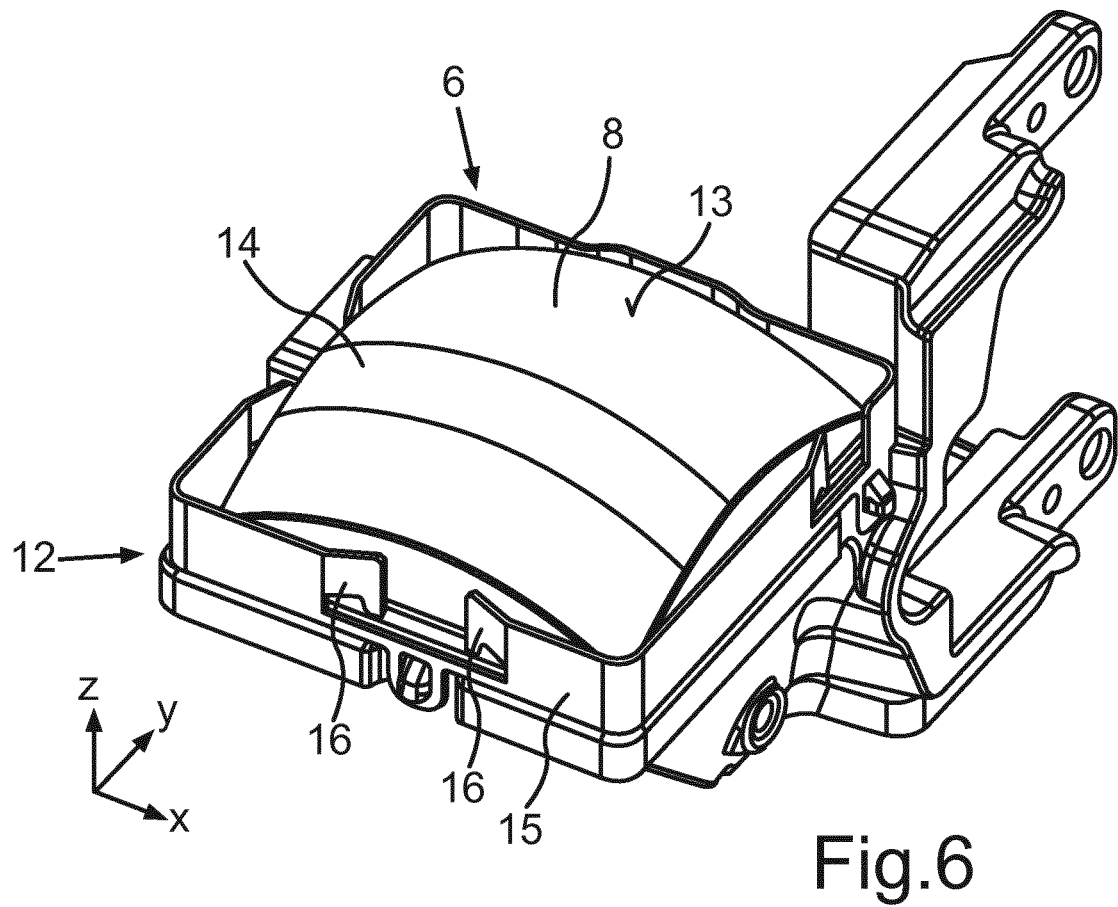
FIG. 6 shows a perspective view of the lens apparatus according to a second embodiment.
Figure 7:
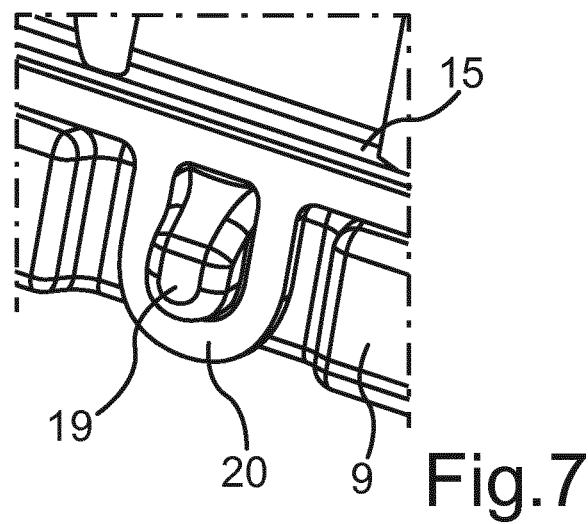
FIG. 7 shows the holding element the fastening element of the lens apparatus according to FIG. 6.

FIG. 6 shows a lens apparatus 6 in a second embodiment. Here, the holding frame 15 and the spring elements 16 have an integral embodiment. Moreover, the fastening element 20 has an integral embodiment with the holding frame 15. The fastening apparatus 12 can be produced from a metal sheet by means of a punching and bending process. The respective spring elements 16 are embodied as tabs which, firstly, hold the reception lens 8 on the fastening device 9 in a resilient manner in the first direction z and, secondly, centre the reception lens 8 in the holding frame 15 along the second and/or third direction x, y. FIG. 7 shows a detailed view of the lens apparatus according to FIG. 6, with the interaction between the fastening element 20 and the holding element 19 of the support device 9 being depicted.

Figure 8:
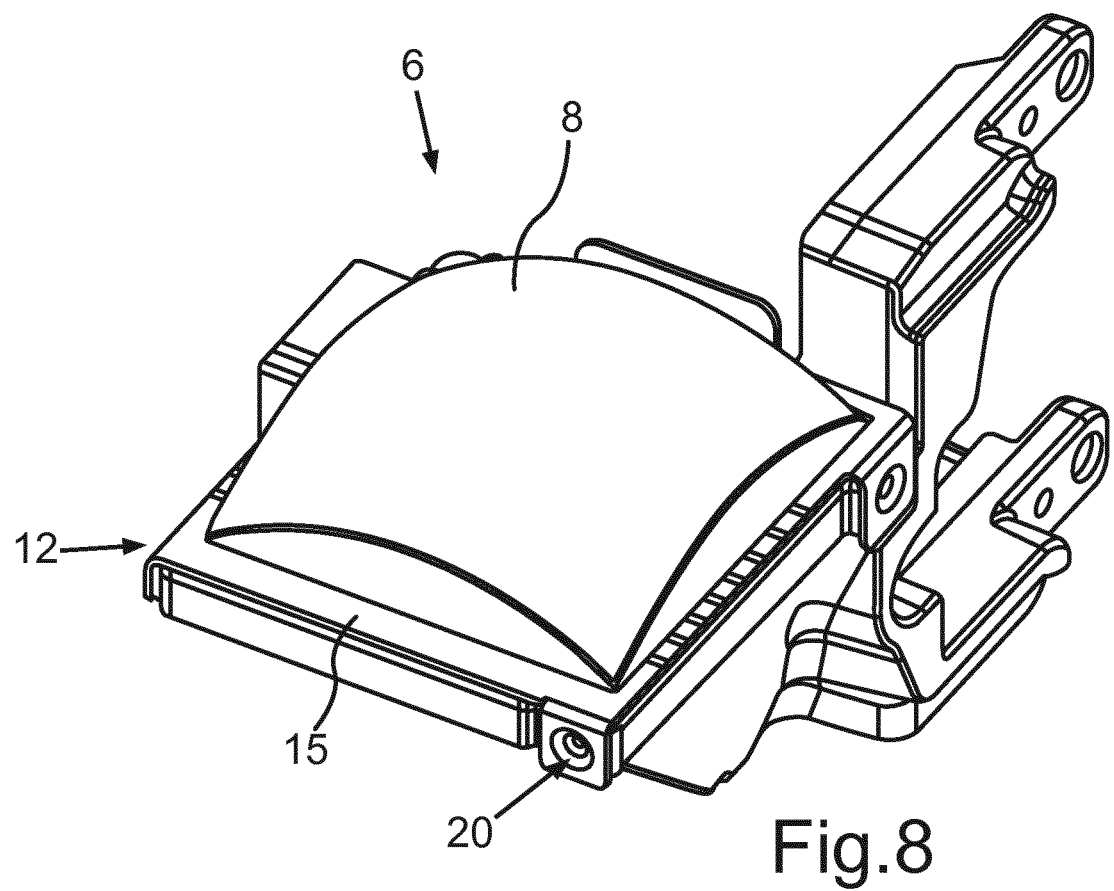
FIG. 8 shows a perspective view of the lens apparatus according to a third embodiment.
Figure 9:
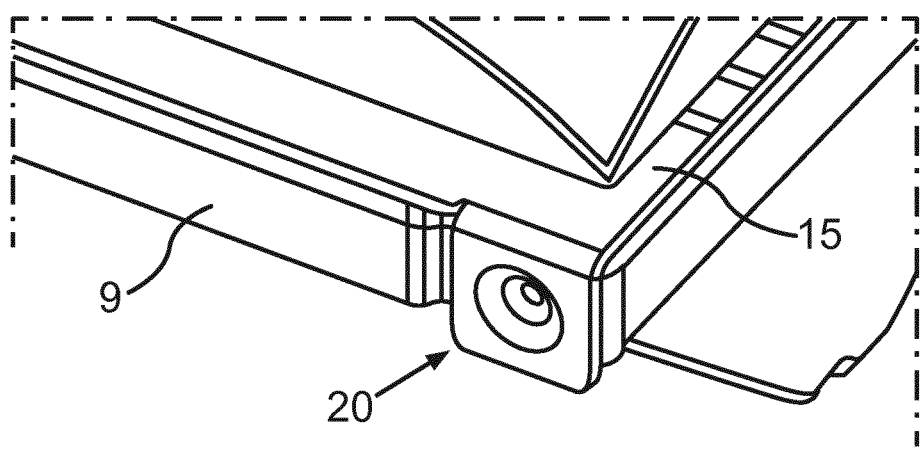
FIG. 9 shows the fastening element of the lens apparatus according to FIG. 8.

FIG. 8 shows a lens apparatus 6 according to a third embodiment. Here, the holding frame 15 has an integral embodiment with the fastening element 20. Moreover, the lens apparatus 6 can have a spring wire 17 or a different spring element 16 which is arranged within the holding frame 15, at least in parts. In this case, the fastening elements 20 are embodied as so-called embossed studs, which can be latched into corresponding cut-outs (not depicted here) in the support device 9. A detailed view of the fastening device 12 of the lens apparatus according to FIG. 8 is shown in FIG. 9.

The invention claimed is:

1. A lens apparatus for an optoelectronic sensor of a motor vehicle, comprising:
    a reception lens, comprising a support device, on which a rear side of the reception lens rests in parts, and comprising a fastening device, by which the reception lens is held on the support device with a spring force that acts in a first direction,
    wherein the fastening device has a holding frame, which circumferentially surrounds the reception lens in a predetermined lateral region and shields the predetermined lateral region from optical radiation, and at least one spring element, which supports the reception lens in relation to the holding frame in at least one second direction that differs from the first direction,
    wherein the reception lens is supported in relation to the holding frame along a third direction different from both the first direction and the at least one second direction by the at least one spring element, and
    wherein the at least one second direction and the third direction extend perpendicular to the first direction.

2. The lens apparatus according to claim 1, wherein the at least one spring element provides the spring force acting in the first direction for holding the reception lens on the support device.

3. The lens apparatus according to claim 1, wherein the support device has a holding element and the fastening device has a fastening element that corresponds to the holding element, wherein the reception lens is held on the support device by an interaction of the holding element with the fastening element in the first direction.

4. The lens apparatus according to claim 3, wherein the spring element and/or the holding frame comprises the fastening element.

5. The lens apparatus according to claim 1, wherein the fastening device has a spring wire, wherein at least a first region of the spring wire forms the at least one spring element.

6. The lens apparatus according to claim 1, wherein the holding frame has at least one recess, in which at least a second region of the spring wire is arranged in such a way that the latter is held on the holding frame in the first direction.

7. The lens apparatus according to claim 1, wherein the holding frame has an integral embodiment with the at least one spring element.

8. An optoelectronic sensor for a motor vehicle, comprising a lens apparatus according to claim 1.

9. The optoelectronic sensor according to claim 8, wherein the optoelectronic sensor is embodied as a LIDAR sensor or as a laser scanner.

10. A motor vehicle comprising an optoelectronic sensor according to claim 8.

11. A method for assembling a lens apparatus for an optoelectronic sensor of a motor vehicle, comprising:
    arranging a reception lens on a support device in such a way that a rear side of the reception lens rests thereon in parts; and
    arranging a fastening device on the reception lens in such a way that the reception lens is held on the support device with a spring force that acts in a first direction,
    wherein the fastening device has a holding frame, which circumferentially surrounds the reception lens in a predetermined lateral region and shields the predetermined lateral region from optical radiation, and at least one spring element, by which the reception lens is supported in relation to the holding frame in at least one second direction that differs from the first direction,
    wherein the reception lens is supported in relation to the holding frame along a third direction different from both the first direction and the at least one second direction by means of the at least one spring element, and
    wherein the at least one second direction and the third direction are perpendicular to the first direction.

* * * * *